United States Patent
Casu et al.

(10) Patent No.: US 9,521,550 B2
(45) Date of Patent: Dec. 13, 2016

(54) REMOTE CONFIGURATION OF DIGITAL VIDEO SURVEILLANCE SYSTEM ELEMENTS

(71) Applicant: MARCH NETWORKS CORPORATION, Ottawa (CA)

(72) Inventors: Mauro Casu, Gatineau (CA); Michael James Boyd, Stittsville (CA)

(73) Assignee: March Networks Corporation, Ottawa (CA)

(*) Notice: Subject to any disclaimer, the term of this patent is extended or adjusted under 35 U.S.C. 154(b) by 0 days.

(21) Appl. No.: 14/575,444

(22) Filed: Dec. 18, 2014

(65) Prior Publication Data

US 2015/0181432 A1 Jun. 25, 2015

Related U.S. Application Data

(60) Provisional application No. 61/919,317, filed on Dec. 20, 2013.

(51) Int. Cl.
*G06F 15/16* (2006.01)
*H04L 29/06* (2006.01)
(Continued)

(52) U.S. Cl.
CPC .............. *H04W 12/06* (2013.01); *H04N 5/77* (2013.01); *H04N 21/43622* (2013.01);
(Continued)

(58) Field of Classification Search
CPC ........... H04W 12/08; H04N 7/18; H04N 5/76; H04L 63/08; G06F 21/6218
(Continued)

(56) References Cited

U.S. PATENT DOCUMENTS 6,470,454 B1 * 10/2002 Challener ............... G06F 21/31
709/229
7,873,710 B2    1/2011 Kiley et al.
(Continued)

OTHER PUBLICATIONS

Seachange International Inc. "Systems and Methods for Associating a Mobile Electronic Device with a Preexisting Subscriber Account" in Patent Application Approval Process, Entertainment News Weekly (NewRX), Aug. 2, 2013,vol. 213, 5 pages.
(Continued)

*Primary Examiner* — Evans Desrosiers
(74) *Attorney, Agent, or Firm* — Curtis B. Behmann; Borden Ladner Gervais LLP

(57) ABSTRACT

A method and system are provided for configuring or provisioning a digital video surveillance system (DVSS) element, such as a digital video recorder (DVR). Implementations described herein use a scannable device identifier, such as a bar code or a quick response (QR) code, to uniquely identify a DVSS element. Rather than relying on a technician connecting a laptop to the DVSS element using a direct wired connection, or on the availability of network connectivity, the bar code of the DVSS element is scanned, optionally a network name is assigned and a network password is calculated based on the scannable device identifier. A direct wireless connection is established between a mobile communications device and a wireless transceiver at the DVR. An authentication screen is displayed to enable the configuration connection and provide access to configuration functions for configuring or provisioning the DVSS element.

12 Claims, 4 Drawing Sheets

(51) Int. Cl.
*H04W 12/06* (2009.01)
*H04N 21/436* (2011.01)
*H04N 21/4363* (2011.01)
*H04N 5/77* (2006.01)
*G06F 21/00* (2013.01)
*H04N 7/18* (2006.01)
*H04W 12/04* (2009.01)
*G08B 13/196* (2006.01)

(52) U.S. Cl.
CPC ... *H04N 21/43637* (2013.01); *G08B 13/1968* (2013.01); *H04N 7/18* (2013.01); *H04W 12/04* (2013.01)

(58) Field of Classification Search
USPC ......... 713/168–174, 182–186, 202; 709/206, 709/225, 229, 249, 389; 726/2–8
See application file for complete search history.

(56) References Cited

U.S. PATENT DOCUMENTS

| | | |
|---|---|---|
| 8,261,315 B2 | 9/2012 | Barton |
| 8,442,498 B2 | 5/2013 | Yin et al. |
| 8,489,583 B2 | 7/2013 | Phillips et al. |
| 8,544,724 B2 | 10/2013 | Gilbert et al. |
| 2002/0009208 A1 | 1/2002 | Alattar et al. |
| 2005/0216302 A1 | 9/2005 | Raji et al. |
| 2008/0063381 A1 | 3/2008 | Conroy et al. |
| 2012/0138671 A1 | 6/2012 | Gaede et al. |
| 2012/0324076 A1 | 12/2012 | Zerr et al. |
| 2013/0191903 A1* | 7/2013 | Jaudon ............... H04L 63/08 726/7 |
| 2013/0221083 A1 | 8/2013 | Doss et al. |
| 2013/0238685 A1 | 9/2013 | Aziz |
| 2014/0130145 A1* | 5/2014 | Yeleswarapu ........... H04L 61/30 726/9 |

OTHER PUBLICATIONS

Haber et al., "Phone-Controlled Delivery of NGN Service into Residential Environments", The Second International Conference on Next Mobile Applications, Services, and Technologies, Sep. 16-19, 2008, pp. 196-203.

\* cited by examiner

REMOTE CONFIGURATION OF DIGITAL VIDEO SURVEILLANCE SYSTEM ELEMENTS

CROSS REFERENCE TO RELATED APPLICATIONS

This application claims the benefit of priority of U.S. Provisional Patent Application No. 61/919,317 filed Dec. 20, 2013, which is hereby incorporated by reference.

FIELD

The present disclosure relates generally to the field of digital video surveillance. More particularly, the present disclosure relates to configuration or provisioning of digital video surveillance system elements.

BACKGROUND

Video surveillance systems are used to keep watch over physical areas to assist in identifying events of interest. Such events, and associated data, can relate to maintaining safety and security, mitigating risk, increasing operational efficiency, preventing loss of products or revenue, gathering business intelligence, and a variety of other applications.

Digital video surveillance systems are being increasingly used in new installations, or to supplement or replace analog video surveillance systems. A digital video surveillance system (DVSS) includes a plurality of elements, which can include one or more edge devices, such as digital video cameras, and one or more digital video recorders (DVRs).

Each DVSS element must be provisioned, or configured, prior to use. To provision a DVR, a technician or installer typically physically connects a laptop to a 100Base-T port of the DVR and performs the provisioning. However, such approaches are cumbersome and require specialized equipment, materials and physical setup. Similar restrictions apply to the provisioning of other DVSS elements.

Improvements in provisioning DVSS elements, such as a DVR, are desirable.

DETAILED DESCRIPTION

Figure 1:
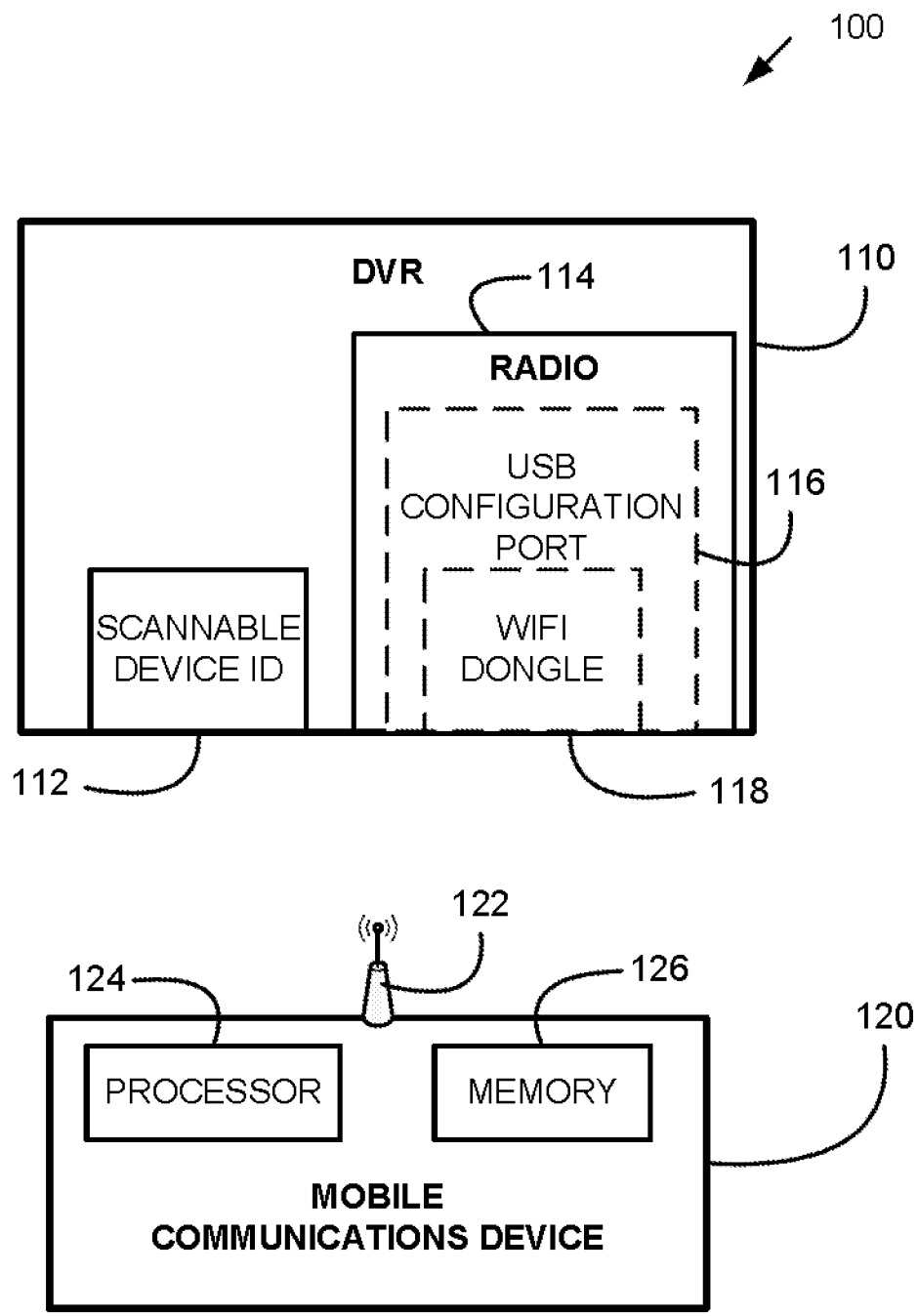
FIG. 1 is a block diagram of a digital video security system according to an embodiment of the present disclosure.

A method and system are provided for configuring or provisioning a digital video surveillance system (DVSS) element, such as a digital video recorder (DVR). Implementations described herein use a scannable device identifier such as a bar code or a quick response (QR) code, to uniquely identify a DVSS element. Rather than relying on a technician connecting a laptop to the DVSS element using a direct wired connection, or relying on the availability of network connectivity, the scannable device identifier of the DVSS element is scanned, optionally a network name can be assigned and a network password calculated based on the scanned device identifier. A direct wireless connection is established between a mobile communications device and a wireless transceiver at the DVR, which can be implemented as a USB wireless dongle inserted in a configuration port of the DVSS element. The configuration connection is enabled, for example including displaying an authentication screen to provide access to configuration functions for configuring or provisioning the DVSS element.

In an embodiment, the present disclosure provides a non-transitory computer-readable memory storing statements and instructions for execution by a mobile communications device processor to perform a method for establishing a provisioning connection to a digital video recorder (DVR). The processor-implemented method comprises: scanning a quick response (QR) code on the DVR, the QR code representing a serial number for the DVR, each DVR in a digital video surveillance system having a unique QR code; establishing a network name for the DVR, the network name being a derivative of the serial number associated with the QR code; calculating a network password based on the QR code; establishing a wireless connection between the mobile communications device and a USB wireless dongle inserted in a configuration port of the DVR; and displaying an authentication screen to provide access to configuration functions for provisioning the DVR.

In an example embodiment, in the method, establishing the wireless connection comprises establishing a direct wireless connection between a radio of the mobile communications device and the USB wireless dongle in the absence of a connection to a network.

In an example embodiment, in the method, calculating the network password is based on a network password calculation function in the mobile communications device.

In an example embodiment, the mobile communications device comprises a smartphone and wherein the provisioning connection is established between the smartphone and the DVR.

In an example embodiment, the method further comprises sending a provisioning command from the mobile communications device to the DVR over the wireless connection between the mobile communications device and the DVR.

In an embodiment, the present disclosure provides a non-transitory computer-readable memory storing statements and instructions for execution by a mobile communications device processor to perform a method for establishing a configuration connection to a digital video surveillance system (DVSS) element. The processor-implemented method comprises: scanning a scannable device identifier on the DVSS element, the scannable device identifier representing a serial number for the DVSS element, each DVSS element in a digital video surveillance system having a unique scannable device identifier; establishing a network name for the DVSS element, the network name being a derivative of the serial number associated with the scannable device identifier; calculating a network password based on the scannable device identifier; establishing a wireless connection between the mobile communications device and a wireless transceiver at the DVSS element; and displaying an authentication screen to provide access to configuration functions for configuring the DVSS element.

In an example embodiment, in the method, establishing the wireless connection comprises establishing a direct wireless connection between a radio of the mobile communications device and the USB wireless dongle in the absence of a connection to a network.

In an example embodiment, in the method, calculating the network password is based on a network password calculation function in the mobile communications device.

In an example embodiment, the mobile communications device comprises a smartphone and wherein the provisioning connection is established between the smartphone and the DVSS element.

In an example embodiment, the method further comprises sending a provisioning command from the mobile communications device to the DVSS element over the wireless connection between the mobile communications device and the DVSS element.

In an example embodiment, the DVSS element comprises an edge device, or a digital video camera.

In an example embodiment, the bar code comprises a quick response (QR) code.

In an embodiment, the present disclosure provides a non-transitory computer-readable memory storing statements and instructions for execution by a processor in a mobile communications device to perform a method of establishing a configuration connection to a digital video surveillance system (DVSS) element. The processor-implemented method comprises: scanning a scannable device identifier on the DVSS element, the scannable device identifier representing a serial number for the DVSS element, each DVSS element in a digital video surveillance system having a unique scannable device identifier; establishing a direct wireless connection between the mobile communications device and a wireless transceiver at the DVSS element based on the scanned device identifier; and enabling the configuration connection for configuring the DVSS element.

In an example embodiment, establishing the direct wireless connection comprises establishing the direct wireless connection between a radio of the mobile communications device and the wireless transceiver of the DVSS in the absence of a connection to a network.

In an example embodiment, the method further comprises: establishing a network name for the DVSS element, the network name being a derivative of the serial number associated with the scannable device identifier; calculating a network password based on the scannable device identifier and is performed using a network password calculation function in the mobile communications device; and establishing the direct wireless connection is performed using the established network name and the calculated network password.

In an example embodiment, the method further comprises sending a provisioning command from the mobile communications device to the DVSS element over the wireless connection between the mobile communications device and the DVSS element.

In an example embodiment, the method further comprises displaying an authentication screen to provide access to configuration functions for configuring the DVSS element.

Reference to specific elements of various embodiments of the present disclosure will now be made.

FIG. 1 is a block diagram of a digital video security system 100 according to an embodiment of the present disclosure. The example DVSS system 100 in FIG. 1 comprises a digital video recorder 110. In other example embodiments, the system 100 comprises a plurality of DVRs 110, and a plurality of edge devices (not shown), such as digital video cameras. In known cumbersome approaches, an installer or technician must bring a laptop and cabling and be able to physically connect the laptop to the configuration port of the DVR in order to provision the DVR.

According to an embodiment of the present disclosure, a mobile communications device 120 is provided, the mobile communications device being configured to establish a wireless connection, such as a direct wireless connection, to the DVR 110, for example using a radio or wireless transceiver 122. The direct wireless connection can be established between the mobile communications device 120 and the DVR 110 in the absence of a network connection, such as in the absence of an internet connection, or in the absence of a cellular network or other network connectivity. In an example embodiment, the mobile communications device 120 comprises a smartphone, a tablet, an e-reader or any other mobile communications device having wireless communication capabilities.

In an embodiment, the mobile communications device 120 comprises a processor 124 and a memory 126 storing statements and instructions for execution by the processor 124 to perform a method of establishing a provisioning connection to a digital video recorder, or other DVSS element, as described herein.

In an example implementation, the mobile communications device 120 is the installer's own mobile communications device, which is provided with a suitable software application, or app, to perform a method according to an embodiment of the present disclosure. Providing such functionality as an app on the installer's or technician's own mobile communications device reduces operating costs, and enables faster and more responsive service, since the installer will typically have their own mobile communications device with them at all times, while they may not always have a laptop, the required cabling, or the ability to physically connect to a configuration port of the DVR.

As shown in FIG. 1, the DVR 110 comprises a scannable device identifier 112, such as a bar code or quick response (QR) code. In another embodiment, the scannable device identifier is any visual representation associated with a unique device identifier, and which is decodable after scanning to determine the unique device identifier. In an example embodiment, each element in a DVSS is assigned a unique scannable device identifier. In an example embodiment, the scannable device identifier represents, or has encoded therein, a serial number for the DVR or other DVSS element. In another example embodiment, the scannable device identifier has encoded therein a network password for the DVR. The mobile communications device 120 is configured to scan the scannable device identifier 112, such as by having installed thereon a QR code scanner app.

Based on the scanned device identifier, the mobile communications device 120 establishes the direct wireless connection with the DVR 110, which will be described in further detail in relation to the flowchart of FIG. 2. In an embodiment, the DVR 110 is provided with wireless communication capabilities, for example by way of a radio or wireless transceiver 114. In the example embodiment of FIG. 2, the DVR 110 comprises a configuration port 116, to which an installer typically connects a 100Base-T cable to provision the DVR. In an embodiment of the present disclosure, the radio or wireless transceiver is implemented as a WiFi dongle, or wireless dongle, 118 inserted in the configuration port. In an example embodiment, the configuration port is a USB port, and the wireless dongle is a USB device.

The wireless dongle 118 is configured to communicate directly with the mobile communications device 120, without the need for connection to a wireless, cellular or other network. There is no need for a server or any other connection. The DVR does not need to be connected to a network, and simply needs to be provided with power, such as from a battery or an electrical power source. In an example embodiment, the wireless dongle 118 creates a network, similar to a wireless hotspot. The information embedded in the scannable device identifier or QR code allows the mobile communications device to authenticate to the wireless hotspot using an Ethernet network, or Ethernet connection.

Figure 2:
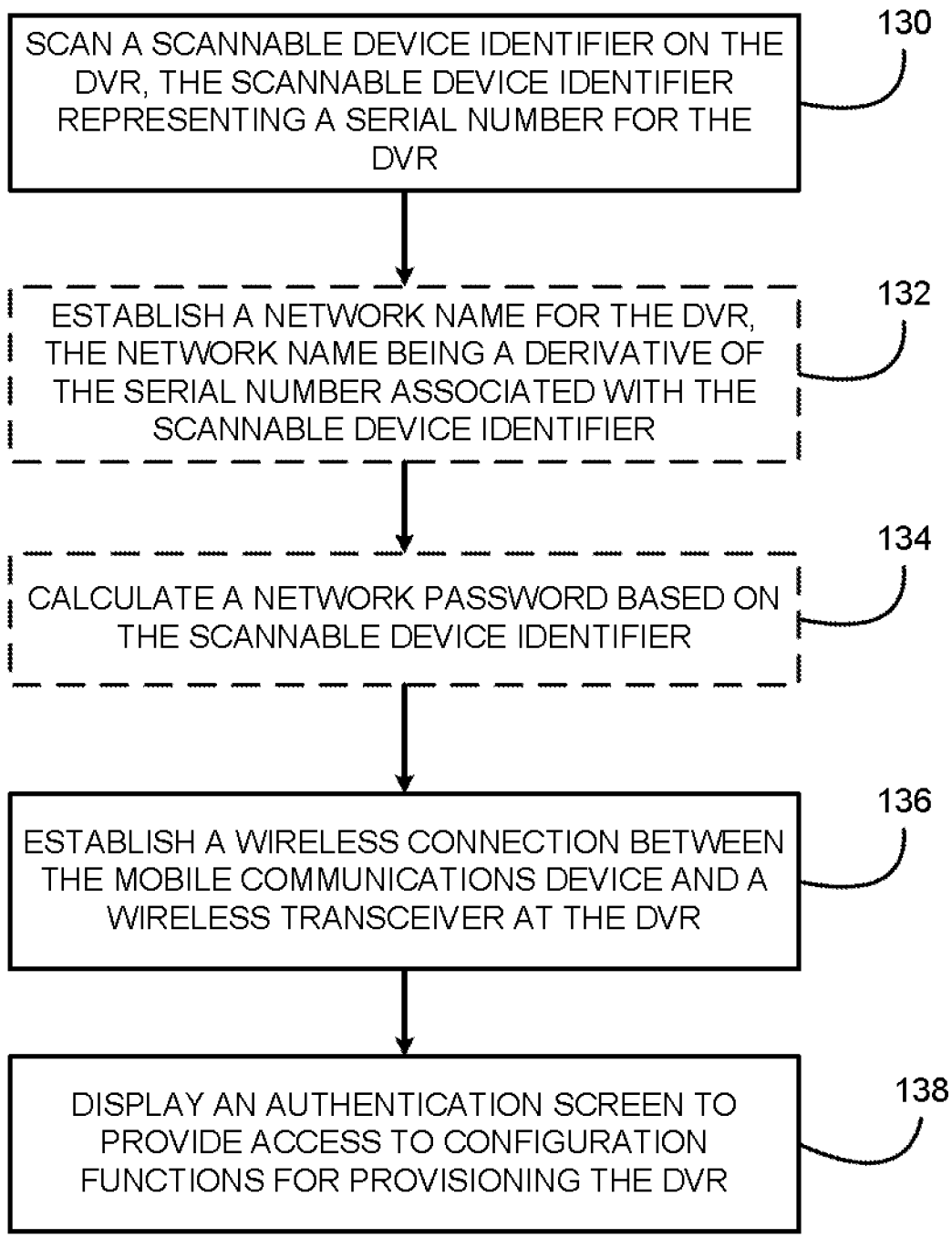
FIG. 2 is a flowchart illustrating a method of establishing a provisioning connection to a digital video recorder according to an embodiment of the present disclosure.

FIG. 2 is a flowchart illustrating a method of establishing a provisioning connection to a digital video recorder. In an example embodiment, the method is a processor-implemented method, for example performed by the processor 124 of the mobile communications device 120 of FIG. 1. The method begins at 130 with scanning, using a mobile communications device, a scannable device identifier on the DVR. In an embodiment, the scannable device identifier is a bar code, such as a quick response code. In an embodiment, the scannable device identifier represents a serial number for the DVR. Each DVR in a digital video surveillance system has a unique identifier or QR code.

At optional step 132, a network name is established for the DVR, the network name being a derivative of the serial number associated with the scannable device identifier. At optional step 134, a network password is calculated based on the scannable device identifier, and based on an internal method in the mobile communications device. In an example embodiment, calculating the network password is based on a network password calculation function in the mobile communications device.

At 136, a wireless connection is established between the mobile communications device and a wireless transceiver at the DVR, which can be a USB wireless dongle inserted in a configuration port of the DVR. The provisioning connection is then enabled for configuring the DVSS element. At 138, an authentication screen is displayed, for example on a display of the mobile communications device, to provide access to configuration functions for provisioning the DVR. In an embodiment, the method can further comprise sending a provisioning command from the mobile communications device to the DVSS element over the wireless connection between the mobile communications device and the DVSS element. The details regarding receipt and processing of the provisioning command at the DVR are known to one of ordinary skill in the art.

In an example embodiment, a method of provisioning a DVR can include the following: USB WIFI dongle is inserted into DVR USB port; launch configuration application on mobile communication device; scan the QR code using configuration application; configuration application determines DVR WiFi network name and calculates network password from QR code, each DVR having a unique QR code; configuration application establishes a connection to the DVR; using the configuration application, log into the DVR; configuration application provides ability for user to configure DVR directly via USB-WiFi. Some configuration examples include: IP configuration; show DVR information; provision CEF; provide access to knowledge base; integrate with financial/banking features or tools; and set ESM manager.

Figure 3:
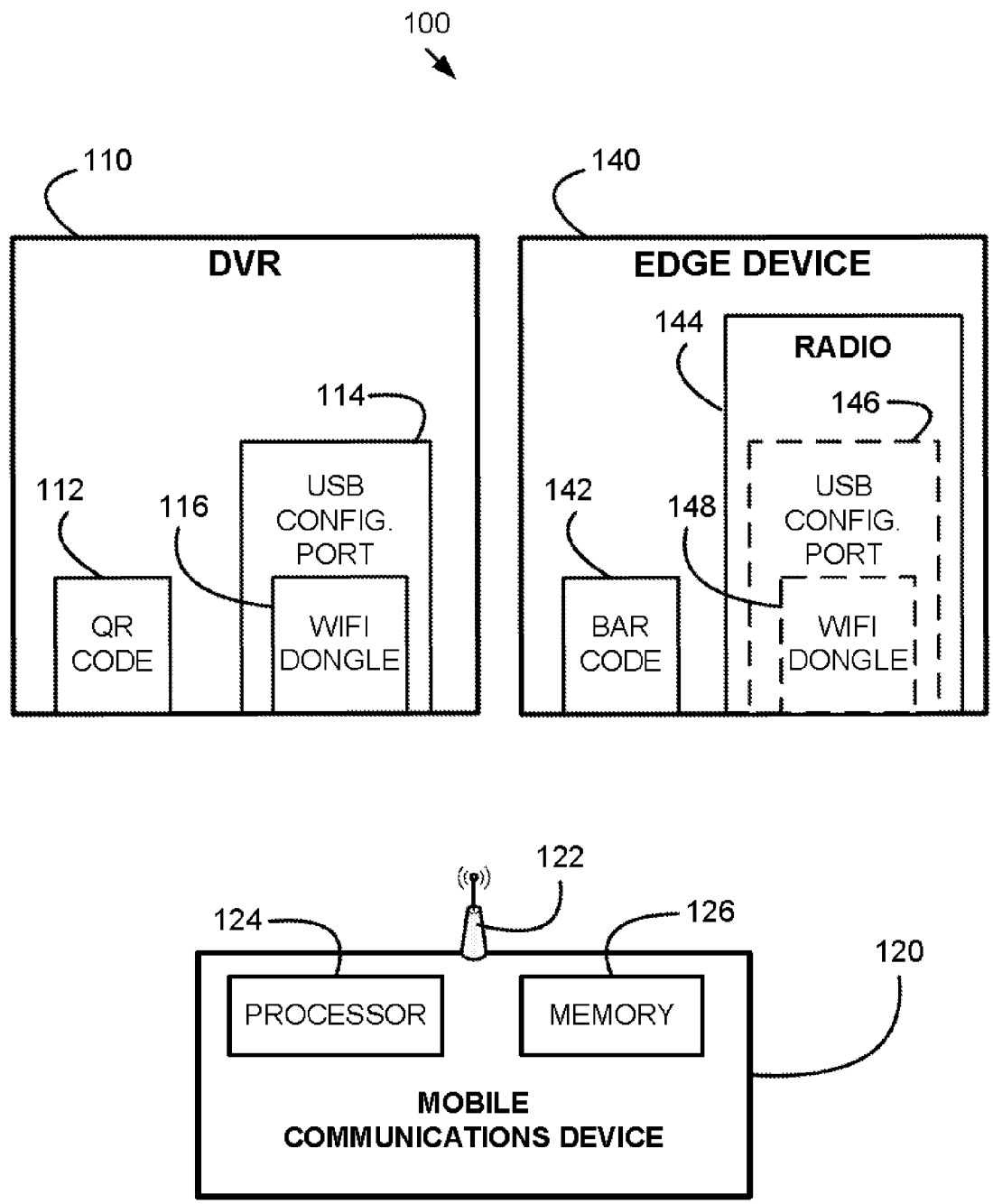
FIG. 3 is a block diagram of a digital video security system according to another embodiment of the present disclosure.

FIG. 3 is a block diagram of a digital video security system according to another embodiment of the present disclosure. In FIG. 3, the DVSS 100 comprises a DVR 110 and an edge device 140, such as a digital video camera. In other embodiments, any number of DVRs 110 and edge devices 140 may be provided. According to an embodiment of the present disclosure, the mobile device 120 includes a radio or wireless transceiver 122 and is configured to establish a configuration connection to any DVR or edge device in the DVSS 100, to configure or provision the DVSS element. For example, the edge device 140 is provided with a scannable device identifier, such as a bar code 142. The edge device 140 is provided with wireless communication capabilities, for example by way of a radio or wireless transceiver 144. In an embodiment of the present disclosure, the edge device comprises a USB configuration port 146, and the radio or wireless transceiver is implemented as a wireless dongle 148 inserted in the configuration port 146. The operation and interaction of elements in the system of FIG. 3 is similar to the operation previously described in relation to FIG. 1, and details of such operation are omitted here for the sake of brevity.

Figure 4:
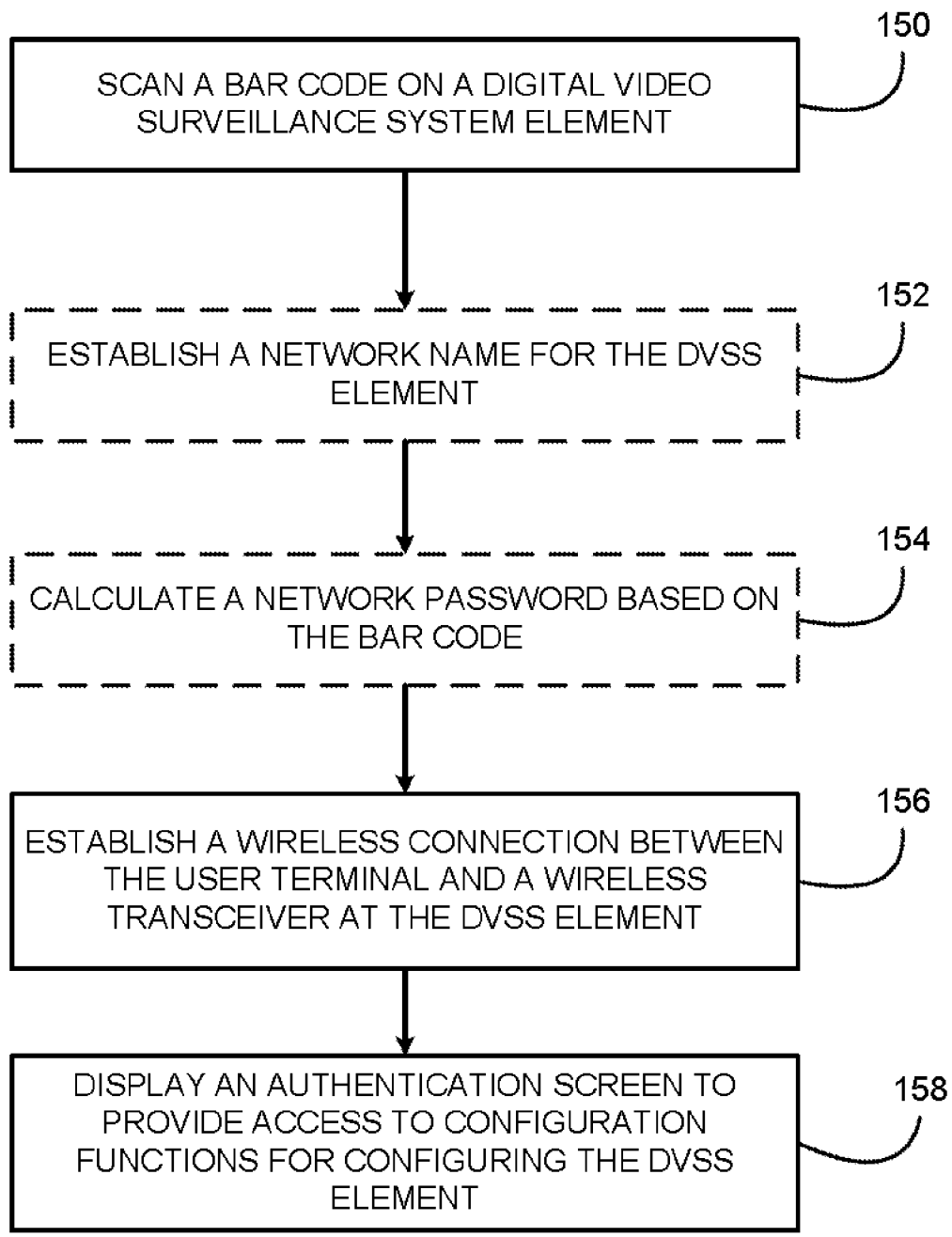
FIG. 4 is a flowchart illustrating a method of establishing a configuration connection to a digital video security system element according to an embodiment of the present disclosure.

FIG. 4 is a flowchart illustrating a method of establishing a configuration connection to a digital video security system element according to an embodiment of the present disclosure. In an example embodiment, the method is a processor-implemented method, for example performed by the processor 124 of the mobile communications device 120 of FIG. 3. The method begins at 150 with scanning, using a mobile communications device, a scannable device identifier such as a bar code on the DVSS element. The bar code represents a serial number for the DVSS element. Each DVSS element in a digital video surveillance system has a unique bar code. At 152, a network name is optionally established for the DVSS element, the network name being a derivative of the serial number associated with the bar code. At 154, a network password is optionally calculated based on the bar code, and based on an internal method in the mobile communications device. At 156, a wireless connection is established between the mobile communications device and a wireless transceiver at the DVR, which can be implemented as a USB wireless dongle inserted in a configuration port of the DVSS element. The configuration connection is then enabled for configuring the DVSS element. At 158, an authentication screen is displayed, for example on a display of the mobile communications device, to provide access to configuration functions for configuring, or provisioning, the DVSS.

Embodiments of the present disclosure provide improvements over known configuration approaches, by enabling an installer or technician to use a mobile communications device to configure or provision a digital video surveillance system element, such as a DVR, digital video camera, or other edge device. Since a direct wireless connection is used, there is no need for cabling a physical connection, and no need for a connection to the Internet or another communications network. A wireless dongle provided in the USB configuration port of a DVSS element enables the direct wireless connection with the mobile communications device, enabling remote configuration and provisioning of any DVSS element with reductions in time and expense.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A non-transitory computer-readable memory storing statements and instructions for execution by a mobile communications device processor to perform a method for establishing a configuration connection to a digital video surveillance system (DVSS) element, the processor-implemented method comprising:
- scanning a scannable device identifier on the DVSS element, the scannable device identifier representing a serial number for the DVSS element, each DVSS element in a digital video surveillance system having a unique scannable device identifier;
- establishing a network name for the DVSS element, the network name being a derivative of the serial number associated with the scannable device identifier;
- calculating a network password based on the scannable device identifier;
- establishing a wireless connection between the mobile communications device and a wireless transceiver at the DVSS element; and
- displaying an authentication screen to provide access to configuration functions for configuring the DVSS element.

2. The non-transitory computer-readable memory of claim 1 wherein, in the method, establishing the wireless connection comprises establishing a direct wireless connection between a radio of the mobile communications device and the USB wireless dongle in the absence of a connection to a network.

3. The non-transitory computer-readable memory of claim 1 wherein, in the method, calculating the network password is based on a network password calculation function in the mobile communications device.

4. The non-transitory computer-readable memory of claim 1 wherein the mobile communications device comprises a smartphone and wherein the provisioning connection is established between the smartphone and the DVSS element.

5. The non-transitory computer-readable memory of claim 1 wherein the method further comprises sending a provisioning command from the mobile communications device to the DVSS element over the wireless connection between the mobile communications device and the DVSS element.

6. The non-transitory computer-readable memory of claim 1 wherein the DVSS element comprises an edge device.

7. The non-transitory computer-readable memory of claim 1 wherein the DVSS element comprises a digital video camera.

8. The non-transitory computer-readable memory of claim 1 wherein the bar code comprises a quick response (QR) code.

9. A non-transitory computer-readable memory storing statements and instructions for execution by a processor in a mobile communications device to perform a method of establishing a configuration connection to a digital video surveillance system (DVSS) element, the processor-implemented method comprising:
- scanning a scannable device identifier on the DVSS element, the scannable device identifier representing a serial number for the DVSS element, each DVSS element in a digital video surveillance system having a unique scannable device identifier;
- establishing a direct wireless connection between the mobile communications device and a wireless transceiver at the DVSS element based on the scanned device identifier;
- enabling the configuration connection for configuring the DVSS element;
- establishing a network name for the DVSS element, the network name being a derivative of the serial number associated with the scannable device identifier;
- calculating a network password based on the scannable device identifier and is performed using a network password calculation function in the mobile communications device; and
- wherein establishing the direct wireless connection is performed using the established network name and the calculated network password.

10. The non-transitory computer-readable memory of claim 9 wherein, in the method, establishing the direct wireless connection comprises establishing the direct wireless connection between a radio of the mobile communications device and the wireless transceiver of the DVSS in the absence of a connection to a network.

11. The non-transitory computer-readable memory of claim 9 wherein the method further comprises sending a provisioning command from the mobile communications device to the DVSS element over the wireless connection between the mobile communications device and the DVSS element.

12. The non-transitory computer-readable memory of claim 9 wherein the method further comprises displaying an authentication screen to provide access to configuration functions for configuring the DVSS element.

* * * * *